(12) United States Patent
Su et al.

(10) Patent No.: US 12,535,296 B2
(45) Date of Patent: Jan. 27, 2026

(54) LIGHT SOURCE STRUCTURE, SIGHTING DEVICE THEREOF, AND SHOOTING DEVICE THEREOF

(71) Applicant: PSG Opto Development Co., Ltd, Guangdong (CN)

(72) Inventors: San Su, Guangdong (CN); Peng Liu, Guangdong (CN)

(73) Assignee: PSG OPTO DEVELOPMENT CO., LTD, Shenzhen (CN)

( * ) Notice: Subject to any disclaimer, the term of this patent is extended or adjusted under 35 U.S.C. 154(b) by 171 days.

(21) Appl. No.: 18/413,836

(22) Filed: Jan. 16, 2024

(65) Prior Publication Data

US 2024/0393084 A1 Nov. 28, 2024

(30) Foreign Application Priority Data

May 26, 2023 (CN) .......................... 202321317021.7

(51) Int. Cl.
*F41G 1/34* (2006.01)
*G02B 23/10* (2006.01)

(52) U.S. Cl.
CPC ........... *F41G 1/345* (2013.01); *G02B 23/105* (2013.01)

(58) Field of Classification Search
CPC ... F41G 1/345; F41G 1/34; F41G 1/30; G02B 23/105
See application file for complete search history.

(56) References Cited

U.S. PATENT DOCUMENTS 9,299,895 B1* 3/2016 Hsing Chen ......... H10H 20/853
2025/0116485 A1* 4/2025 Wing ........................ F41G 1/30

* cited by examiner

*Primary Examiner* — J. Woodrow Eldred
(74) *Attorney, Agent, or Firm* — MUNCY, GEISSLER, OLDS & LOWE, P.C.

(57) ABSTRACT

The present disclosure relates to the illuminant structure technical field. Disclosed are a light source structure, a sighting device and a shooting device, wherein the sight light source structure is used for the sighting device. The light source structure includes a substrate, a light-emitting chip arranged on the substrate, a bonding wire configured for electrically connecting the substrate and the light-emitting chip, and light-absorbing glue coated on the bonding wire. By improving the structure of the light source structure, specifically, by not covering the light-transmitting protective layer on the light-emitting chip, the light-transmitting protective layer is effectively prevented from reflecting light, so that the aiming point formed by the light at the light-emitting place is gathered, and the edge of the aiming point has no stray reflected light so that the wheel library at the edge of the aiming point is clear.

15 Claims, 4 Drawing Sheets

LIGHT SOURCE STRUCTURE, SIGHTING DEVICE THEREOF, AND SHOOTING DEVICE THEREOF

CROSS-REFERENCE TO RELATED APPLICATIONS

This application claims priority to Chinese Patent Application No. 202321317021.7, filed on May 26, 2023, the content of all of which is incorporated herein by reference.

TECHNICAL FIELD

The present disclosure relates to the light source structure technical field, in particular to a light source structure, a sighting device, and a shooting device.

BACKGROUND

A sighting device (also known as sight or gun sight) is usually used to achieve accurate aiming, reduce shooting difficulty, and improve shooting accuracy; Among them, the light source is an important functional component of the sight. To ensure the accuracy of aiming, the aiming points of the light source must be gathered, and stray light cannot appear at the edge of the aiming point, that is, the wheel library at the edge of the aiming point should be clear and there should be no fuzzy outline; However, the structure of the existing light source often has structural self-reflection, which leads to the ambiguity of the outline of the aiming point.

Therefore, the prior art still has shortcomings and deficiencies, and needs to be improved and developed.

SUMMARY

In view of the above shortcomings of the prior art, the present disclosure aims to provide a light source structure, a sighting device, and a shooting device designed to solve the problem that the aiming point of the existing light source structure for a sighting device has parasitic light at the edge of the contour.

The disclosed technical scheme of the present disclosure is as follows: a light source structure for a sighting device, wherein the light source structure includes:
A substrate;
A light-emitting chip arranged on the substrate;
A bonding wire configured to electrically connect the substrate and the light-emitting chip; and
light-absorbing glue configured to cover the bonding wire;
Optionally, the light source structure further includes:
A transparent protective glue layer arranged on the substrate, the transparent protective glue layer covers the substrate, the light-emitting chip, the bonding wire, and the light-absorbing glue.
Optionally, the light source structure further includes:
A dam, the dam is arranged at an edge of the substrate.
Optionally, the light source structure further includes:
A mounting seat, the substrate is arranged on the mounting seat.
Optionally, the mounting seat includes:
A seat body arranged in an isosceles trapezoid shape, and the seat body includes a bottom-end surface, an upper-end surface, a front-end surface, and a rear-end surface; and
A mounting groove arranged on the bottom-end surface, and the substrate is mounted on a groove bottom of the mounting groove.
Optionally, the light source structure further includes:
A glass cover plate arranged on a bearing step, the bearing step is arranged on a side wall of the mounting groove.
Optionally, the light source structure further includes:
A first-side sealing plate arranged at a first-side sealing recess, the first-side sealing recess is arranged on the front-end surface at a position corresponding to the mounting groove; and
A second-side sealing plate arranged at a second-side sealing recess, the second-side sealing recess is arranged on the rear-end surface at a position corresponding to the mounting groove.
Optionally, a first mounting hole and a second mounting hole are arranged on the rear-end surface, and a limiting groove is arranged on the upper-end surface; the groove bottom of the mounting groove is arranged to slant.

The second aspect of the present disclosure can be viewed as providing a sighting device. The sighting device includes a light source structure as described above.

The third aspect of the present disclosure can be viewed as providing a shooting device. The shooting device is configured with the sighting device as described above.

Benefits:
According to the present disclosure, disclosures are a light source structure, a sighting device, and a shooting device. By improving the structure of the light source structure, specifically, by not covering the light-transmitting protective layer on the light-emitting chip, the light-transmitting protective layer is effectively prevented from reflecting light, so that the aiming point formed by the light at the light-emitting place is gathered, and the edge of the aiming point has no stray reflected light so that the wheel library at the edge of the aiming point is clear.

Figure 1:
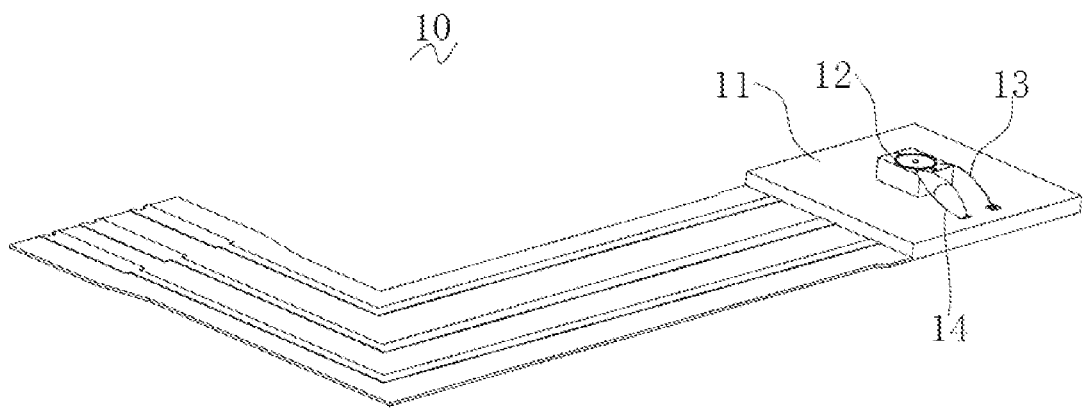
FIG. 1 is a stereoscopic structural schematic diagram of a light source structure, in accordance with a first exemplary embodiment of the present disclosure.

Attached drawing marks: 10—light source structure; 11—substrate; 12—light-emitting chip; 13—bonding wire; 14—light-absorbing glue; 15—transparent protective glue layer; 16—dam; 17—mounting seat; 171—seat body; 172—bottom-end surface; 173—upper-end surface; 174—front-end surface; 175—rear-end surface; 176—mounting groove; 177—bearing step; 178—first-side sealing recess; 179—second-side sealing recess; 1751—first mounting hole; 1752—second mounting hole; 1731—limiting groove; 1761—groove bottom of mounting groove; 181—glass cover plate; 182—first-side sealing plate; 183—second-side sealing plate.

DETAILED DESCRIPTION OF THE EMBODIMENTS

The present disclosure is further explained in detail with reference to some embodiments in combination with the accompanying drawings. The same or similar drawing marks indicate the same or similar elements or elements having the same or similar function. It should be understood that the specific embodiments described herein are used only to explain the present disclosure and not to limit the present disclosure.

It should be understood that, in the description of the present disclosure, the terms "up", "down", "left", and "right" indicate orientations or positions based on the orientations or positions shown in the drawings, only facilitate the description of the present disclosure and simplify the description, rather than indicating or implying that the device or element must have a specific orientation and operation, and therefore it cannot be understood as a limitation of the present disclosure. Furthermore, "first" and "second" are used for descriptive purposes only and cannot be understood as indicating or implying relative importance or implicitly indicating the number of technical features indicated. Therefore, features including "first" and "second" may explicitly or implicitly include one or more of the features. In the description of the present disclosure, unless otherwise stated, "multiple" means more than two.

It should be understood that, in the description of the present disclosure, unless otherwise clearly specified and defined, the terms "fix", "connect", and "arrange" should be generalized understanding, such as, it can be a fixed connection, or a detachable connection, or one connection; it can be mechanically connected or electrically connected; it can be directly connected, or indirectly connected through an intermediate medium, and it can be connected within the two components. For those skilled in the art, the specific meaning of the above terms may be understood in this application.

As shown in FIG. 1, a light source structure 10 for a sighting device is provided in a first embodiment of the present disclosure. The light source structure 10 includes a substrate 11, a light-emitting chip 12, a bonding wire 13, and light-absorbing glue 14. The light-emitting chip 12, the bonding wire 13 and the light-absorbing glue 14 are all arranged on the same end surface of the substrate 11, and a circuit is arranged on the substrate 11. The bonding wire 13 is configured to electrically connect the substrate 11 and the light-emitting chip 12. Optionally, there are two bonding wires 13, and the bonding wires 13 are usually gold or silver. The light-absorbing glue 14 covers the bonding wire 13 to prevent the bonding wire 13 from reflecting light. Optionally, the light-absorbing glue 14 is black, gray or matte. By improving the structure of the light source structure 10, optionally, by not covering a light-transmitting protective layer on the light-emitting chip 12, the light-transmitting protective layer is effectively prevented from reflecting light, so that the aiming point formed by the light at the light-emitting place is gathered, and the edge of the aiming point has no stray reflected light, thus the wheel library at the edge of the aiming point is clear.

Figure 2:
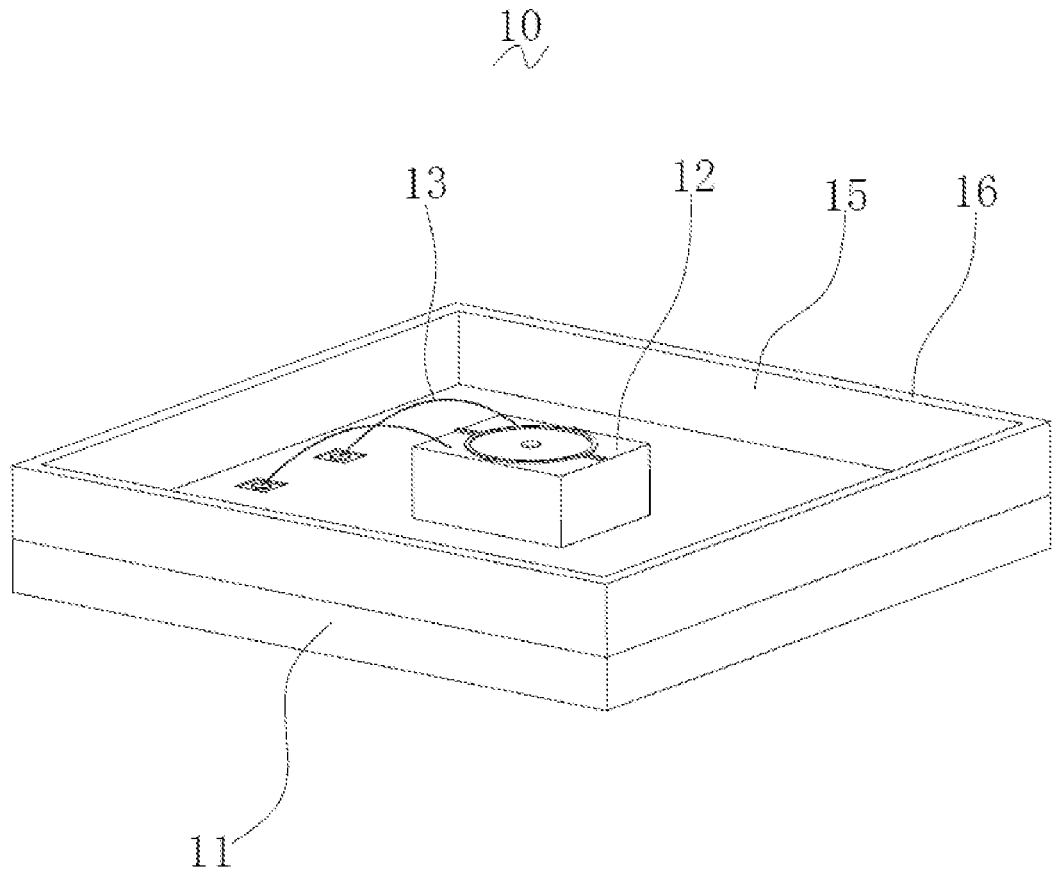
FIG. 2 is a stereoscopic structural schematic diagram of the light source structure, in accordance with a second exemplary embodiment of the present disclosure.

As shown in FIG. 2, in some embodiments, the light source structure 10 further includes a transparent protective glue layer 15 arranged on the substrate 11. The transparent protective glue layer 15 covers the substrate 11, the light-emitting chip 12, the bonding wire 13 and the light-absorbing glue 14. That is, the light source structure 10 in this embodiment includes a substrate 11, a light-emitting chip 12, a bonding wire 13, light-absorbing glue 14 and a transparent protective glue layer 15, wherein the light-emitting chip 12, the bonding wire 13, the light-absorbing glue 14 and the transparent protective glue layer 15 are all arranged on the same end surface of the substrate 11, and the bonding wire 13 are used for electrically connecting the substrate 11 and the light-emitting chip 12. The light-absorbing glue 14 is used for covering the bonding wire 13 to prevent the bonding wire 13 from reflecting light, and the transparent protective glue layer 15 covers the substrate 11, the light-emitting chip 12, the bonding wire 13 and the light-absorbing glue 14, thereby protecting the structure of the light-emitting chip 12.

As shown in FIG. 2, in some embodiments, the light source structure 10 further includes a dam 16 arranged at an edge of the substrate 11. It should be noted that the dam 16 is made of light-absorbing material, which can further protect the structure of the light-emitting chip 12. Furthermore, the light source structure 10 can be provided with a transparent protective layer and the dam 16 at the same time, and the light-emitting chip 12, the bonding wire 13, the light-absorbing glue 14 and the transparent protective glue layer 15 are all arranged inside the dam 16.

Figure 3:
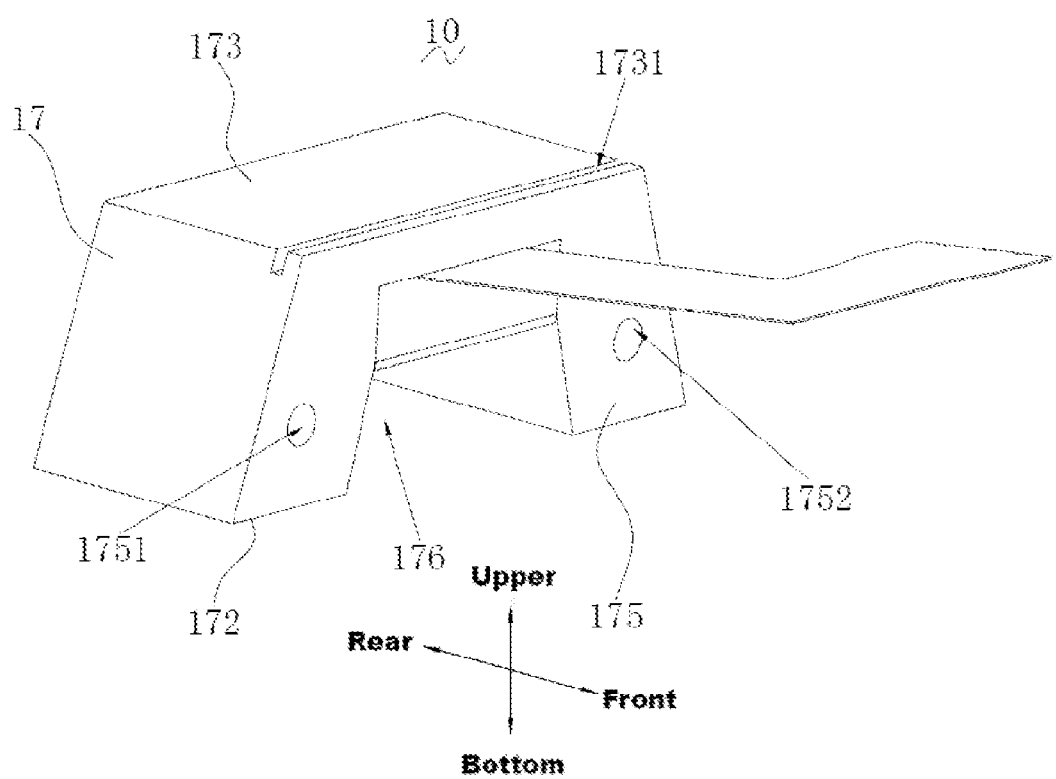
FIG. 3 is a stereoscopic structural schematic diagram of the light source structure, in accordance with a third exemplary embodiment of the present disclosure.
Figure 4:
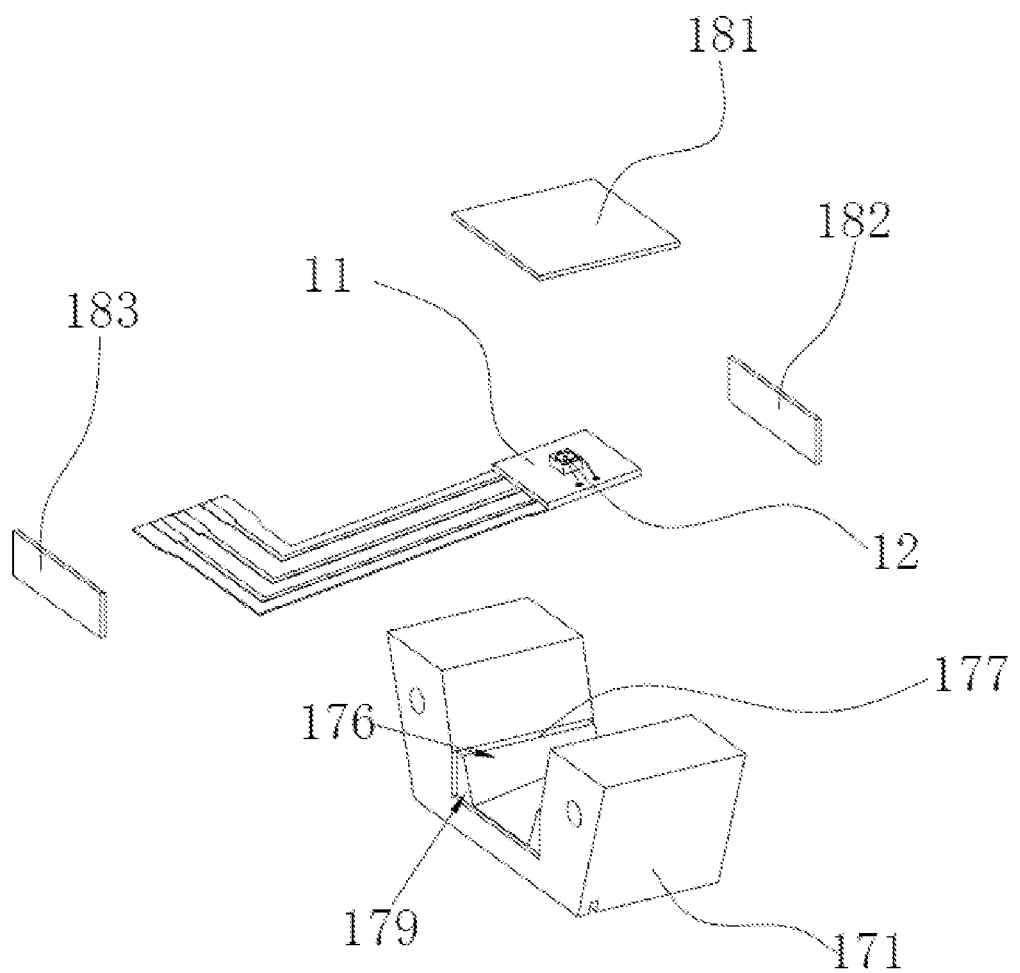
FIG. 4 is an explosion schematic diagram of the light source structure, in accordance with an exemplary embodiment of the present disclosure.
Figure 5:
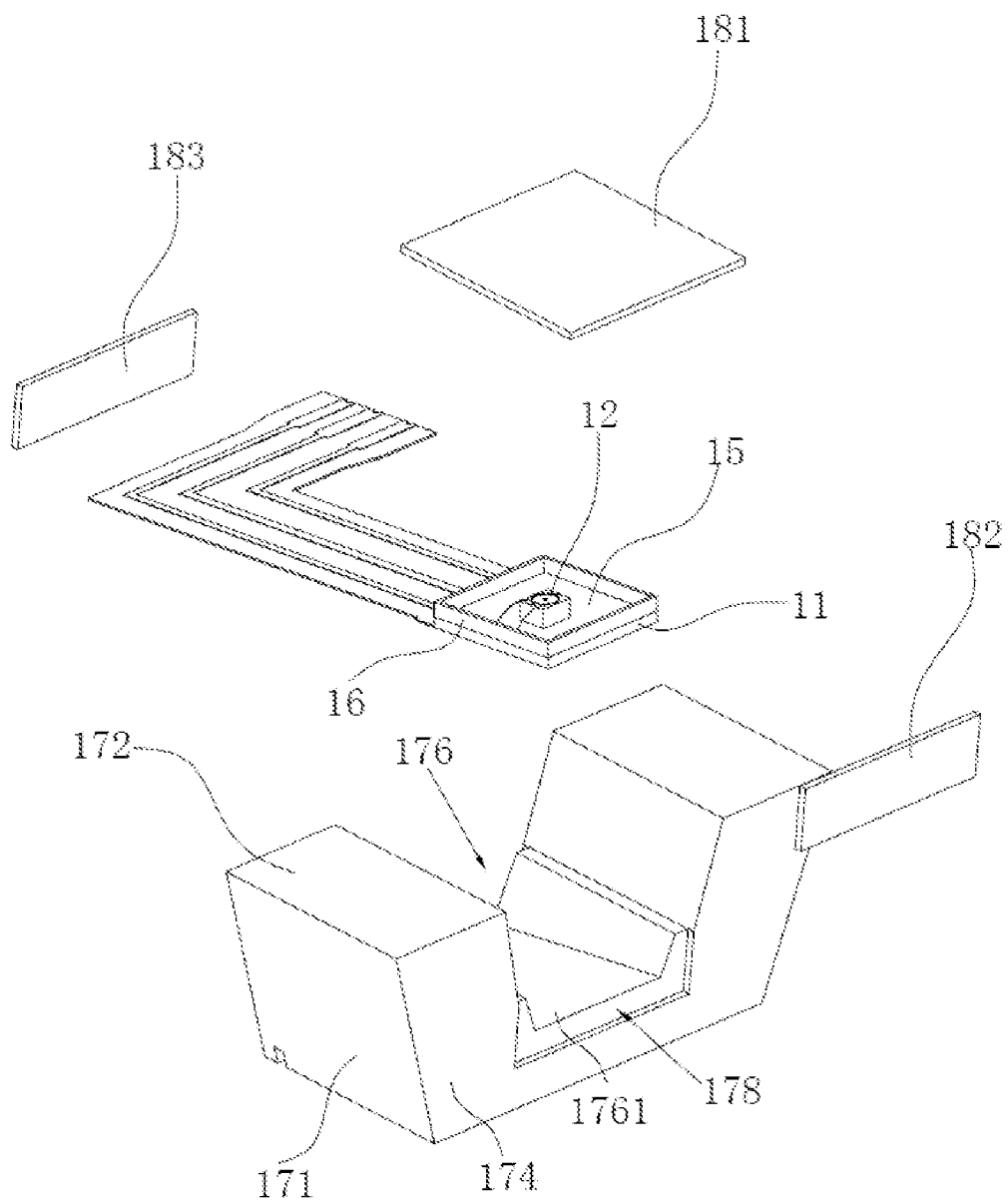
FIG. 5 is an explosion schematic diagram of the light source structure, in accordance with an exemplary embodiment of the present disclosure.

As shown in FIGS. 3-5, in some embodiments, the light source structure 10 further includes a mounting seat 17, and the substrate 11 is arranged on the mounting seat 17. It can be seen that the light-emitting chip 12, the bonding wire 13 and the light-absorbing glue 14 are mounted on the mounting seat 17. Optionally, the light-emitting chip 12, the bonding wire 13, the light-absorbing glue 14 and the transparent protective glue layer 15 are all mounted on the mounting seat 17 along with the substrate 11. Optionally, the light-emitting chip 12, the bonding wire 13, the light-absorbing glue 14, the transparent protective glue layer 15 and the dam 16 are all mounted on the mounting seat 17, the mounting seat 17 is configured for connecting the housing of a sighting device.

In some embodiments, the mounting seat 17 includes a seat body 171 and a mounting groove 176. The seat body 171 is configured for connecting the housing of a sighting device. Optionally, the seat body 171 is arranged in an isosceles trapezoid shape. Optionally, the seat body 171 includes a bottom-end surface 172, an upper-end surface 173, a front-end surface 174 and a rear-end surface 175. The mounting groove 176 is arranged on the bottom-end surface 172, and the substrate 11 is mounted on a groove bottom 1761 of the mounting groove 176. That is, the substrate 11 is mounted in the mounting groove 176, and then the substrate 11 is connected with other structures of the sighting device through the seat body 171, thereby not only protecting the assemblies such as the substrate 11, the light-emitting chip 12, the bonding wire 13, the light-absorbing glue 14, the transparent protective glue layer 15, the dam 16, etc. Furthermore, the groove bottom 1761 of the mounting groove 176 is arranged to slant, that is, the extended surface of the groove bottom 1761 of the mounting groove 176 intersects with the extended surface of the extended surface of the bottom-end surface 172 and the extended surface of the upper-end surface 173, thus the light-emitting surface of the light-emitting chip 12 is arranged opposite to an optic of the sighting device, providing a more accurate aiming effect.

In some embodiments, the light source structure 10 further includes a glass cover plate 181, and the side wall of the mounting groove 176 is arranged with a bearing step 177, and the glass cover plate 181 is arranged on the bearing step 177. The glass cover plate 181 is configured to cooperate with the mounting seat 17 to protect the light-emitting chip 12, making the light source structure 10 not only have the aiming point with clear edge contour but also effectively protect the structure of the light-emitting chip 12.

In some embodiments, the light source structure 10 further includes a first-side sealing plate 182 and a second-side sealing plate 183. A first-side sealing recess 178 is arranged on the front-end surface 174 at a position corresponding to the mounting groove 176. The first-side sealing plate 182 is arranged at the first-side sealing recess 178. A second-side sealing recess 179 is arranged on the rear-end surface 175 at the position corresponding to the mounting groove 176. The second-side sealing plate 183 is arranged at the second-side sealing recess 179. It can be seen that the first-side sealing plate 182, the second-side sealing plate 183, the glass cover plate 181 and the mounting seat 17 cooperate to fix and protect the light-emitting chip 12, making the light source structure 10 not only have the aiming point with clear edge contour, but also can effectively protect the structure of the light-emitting chip 12. Optionally, the first-side sealing plate 182 and the second-side sealing plate 183 are light-absorbing plates, so as to further avoid the occurrence of reflected stray light.

In some embodiments, a first mounting hole 1751 and a second mounting hole 1752 are arranged on the rear-end surface 175. A limiting groove 1731 is arranged on the upper-end surface 173, thereby facilitating the mounting of the seat body 171 on the housing or other structures of the sighting device.

The second aspect of the present disclosure can be viewed as providing a sighting device. The sighting device includes a light source structure 10 as described above. It can be seen that the sighting device with the light source structure 10 provided in some embodiments can further have the aiming point with clear edge contour without sundries, and improve the aiming accuracy of the sight.

The third aspect of the present disclosure can be viewed as providing a shooting device. The shooting device is configured with the sighting device as described above, so that the shooting accuracy of the shooting device can be effectively improved.

In summary, disclosed are a light source structure, a sighting device, and a shooting device, wherein the sight light source structure is used for the sighting device. The light source structure includes: a substrate; a light-emitting chip arranged on the substrate; a bonding wire configured for electrically connecting the substrate and the light-emitting chip; light-absorbing glue coated on the bonding wire. By improving the structure of the light source structure, specifically, by not covering the light-transmitting protective layer on the light-emitting chip, the light-transmitting protective layer is effectively prevented from reflecting light, so that the aiming point formed by the light at the light-emitting place is gathered, and the edge of the aiming point has no stray reflected light so that the wheel library at the edge of the aiming point is clear.

It should be understood that the application of the present disclosure is not limited to the above embodiments, and one of ordinary skill in the field may be equally replaced or changed according to the technical scheme of the present disclosure and the present disclosure thereof, and all such changes or replacements shall fall within the protection of the claims attached to the present disclosure.

What is claimed is:

1. A light source structure for a sighting device, comprising:
   a substrate;
   a light-emitting chip arranged on the substrate;
   a bonding wire configured to electrically connect the substrate and the light-emitting chip;
   light-absorbing glue configured to cover the bonding wire; and
   a transparent protective glue layer arranged on the substrate,
   wherein the transparent protective glue layer covers the substrate, the light-emitting chip, the bonding wire, and the light-absorbing glue.

2. The light source structure according to claim 1, further comprising:
   a dam arranged at an edge of the substrate.

3. The light source structure according to claim 1, further comprising:
   a mounting seat, the substrate is arranged on the mounting seat.

4. The light source structure according to claim 3, wherein the mounting seat further comprises:
   a seat body arranged in an isosceles trapezoid shape, and the seat body comprises a bottom-end surface, an upper-end surface, a front-end surface, and a rear-end surface; and
   a mounting groove arranged on the bottom-end surface, and the substrate is mounted on a groove bottom of the mounting groove.

5. The light source structure according to claim 4, further comprising:
   a glass cover plate arranged on a bearing step, the bearing step is arranged on a side wall of the mounting groove.

6. The light source structure according to claim 5, further comprising:
   a first-side sealing plate arranged at a first-side sealing recess, the first-side sealing recess is arranged on the front-end surface at a position corresponding to the mounting groove; and
   a second-side sealing plate arranged at a second-side sealing recess, the second-side sealing recess is arranged on the rear-end surface at a position corresponding to the mounting groove.

7. The light source structure according to claim 4, wherein a first mounting hole and a second mounting hole are arranged on the rear-end surface, and a limiting groove is arranged on the upper-end surface; the groove bottom of the mounting groove is arranged to slant.

8. A sighting device, wherein the sighting device comprises the light source structure according to claim 1.

9. A shooting device, wherein the shooting device comprises the sighting device according to claim 8.

10. A light source structure for a sighting device, comprising:
    a substrate;
    a light-emitting chip arranged on the substrate;
    a bonding wire configured to electrically connect the substrate and the light-emitting chip;
    light-absorbing glue configured to cover the bonding wire; and
    a mounting seat, the substrate is arranged on the mounting seat,
    wherein the mounting seat comprises:
       a seat body arranged in an isosceles trapezoid shape, and the seat body comprises a bottom-end surface, an upper-end surface, a front-end surface, and a rear-end surface; and
       a mounting groove arranged on the bottom-end surface, and the substrate is mounted on a groove bottom of the mounting groove.

11. The light source structure according to claim 10, further comprising a glass cover plate arranged on a bearing step, the bearing step is arranged on a side wall of the mounting groove.

12. The light source structure according to claim 11, further comprising:
- a first-side sealing plate arranged at a first-side sealing recess, the first-side sealing recess is arranged on the front-end surface at a position corresponding to the mounting groove; and
- a second-side sealing plate arranged at a second-side sealing recess, the second-side sealing recess is arranged on the rear-end surface at a position corresponding to the mounting groove.

13. The light source structure according to claim 10, wherein a first mounting hole and a second mounting hole are arranged on the rear-end surface, and a limiting groove is arranged on the upper-end surface; the groove bottom of the mounting groove is arranged to slant.

14. A sighting device, wherein the sighting device comprises the light source structure according to claim 10.

15. A shooting device, wherein the shooting device comprises the sighting device according to claim 14.

* * * * *